UNITED STATES PATENT OFFICE.

OLIVER W. MOJONNIER, OF OAK PARK, ILLINOIS.

PROCESS FOR MAKING EVAPORATED MILK.

1,362,728.   Specification of Letters Patent.   Patented Dec. 21, 1920.

No Drawing.   Application filed May 8, 1920. Serial No. 379,916.

*To all whom it may concern:*

Be it known that I, OLIVER W. MOJONNIER, a citizen of the United States, residing at Oak Park, in the county of Cook, State of Illinois, have invented certain new and useful Improvements in Processes for Making Evaporated Milk; and I do hereby declare the following to be a full, clear, and exact description of the invention, such as will enable others skilled in the art to which it appertains to make and use the same.

This invention has reference to a new and improved process of making evaporated milk and to the product resultant therefrom, the invention having for its objects, to produce a process which will permit any person inexperienced in the art of making evaporated milk to make a perfect product and a better product than the most experienced operator can make at the present time, with the old process, eliminating the uncertainty of the time and quality of the treatments through which the fresh milk must be put in order to produce evaporated milk having a maximum thickness or viscosity and the smoothest consistency, without being discolored by burning or scorching and thereby maintaining its properties under various climatic conditions, when sealed for use wherever evaporated milk is suitable.

A further object of the invention is to provide an improved process and product resulting therefrom, in which a novel step is embodied for heating of the milk for an exact period of time at a certain temperature, to determine the exact temperature to which the milk must be raised and for what period in order to determine whether or not it is necessary to employ an alkali solution, such as sodium bicarbonate, in order to correct for acidity, and in a manner which will not only obviate the necessity for guess work, but also avoid the possibility of spoiling a large quantity or batch of milk under treatment at an enormous expense.

Other objects and advantages will appear in the further description of the process, and will be particularly pointed out and claimed.

I. In accordance with my improved process and by way of illustrating the preferred method of carrying out the same, the fresh milk is first heated, and I have found that it must take exactly eight minutes to heat 1000 pounds of fresh milk from normal temperature to the boiling point before putting the milk through the next step of the process. This is carried out by any suitable heating means, but preferably by heating the milk in a tank or container in which are arranged a series of coils or pipes through which live steam is conveyed, the heat efficiency being such as to bring 1000 pounds of milk up to the boiling point in exactly eight minutes. It has been found by experience and tests that if less time is employed by one minute, the bicarbonate of soda employed to test for acidity in a novel manner to be hereinafter more particularly set forth and sometimes necessarily used to correct for acidity and thus save large batches of evaporated milk, subsequently cannot be used. If more time is employed for such heating operation preliminary to the condensing or evaporating operation nothing is accomplished and time is lost, the milk being gradually brought to the boiling point before admitting it to the condenser. Heretofore, no exact method has been employed with resultant certainty in carrying out the process, and extensive loss due to the spoiling of the milk, whereas with this important step the successful making of the best product is insured by any person unskilled in the art, the accurate carrying out of the first step permitting the operator to proceed with perfect results in a later step of the process.

II. After the heating operation, the milk is condensed or evaporated by the usual method of condensing milk, namely, by putting it through a vacuum condensing pan. Any vacuum condensing pan at present in use can be employed, slow or rapid condensing of the milk making no appreciable difference in the carrying out of the process in the final product obtained.

III. After the condensing or evaporating operation, the milk is tested for acidity. Five samples are taken from the batch and five six-ounce cans or containers are filled therewith. To the first container nothing is added; and to the remaining containers is added a 10.26% solution of bicarbonate of soda (sodium bicarbonate, $NaHCO_3$) in the respective quantities of .1 c. c. (cubic centimeter to the second can, .2 to the third, .3 to the fourth, and .4 to the fifth, the addition being performed as by means of a pipette or other suitable fluid dispenser, These five cans or containers are sealed and sterilized, preferably in a small steam retort with the cage containing the cans disposed horizontally and revolved at the rate of 10 R. P. M. The temperature is brought to 190° F. in the first ten minutes, and in the subsequent ten minutes it is raised to 243°, this rise being in steps of 5° a minute for nine minutes and of 8° during the last minute of the ten. At 243° the cans containing the evaporated milk are held subject to this temperature for a final fifteen minutes of sterilization with the cage still revolving at the aforementioned speed. At the end of this time, the steam is blown off, cold water is admitted, and the five sample containers are cooled as rapidly as possible. The containers or cans are then opened and the contents examined by use of a teaspoon or other suitable means, and the sample showing the smoothest consistency with the maximum thickness or viscosity is chosen as the proper guide.

IV. After testing the samples, the next step is the sterilization of the entire batch. This is now accomplished by giving it the same treatment as that accorded the sample which has been selected as the proper guide. Suppose that in the test the can chosen as correct has .2 c. c. of the soda solution in it, then if two ounces of solid bicarbonate of soda are added to the large quantity or batch, namely, the 1000 pounds of the milk, the same result will be obtained on the whole batch as the sample can showed, provided the batch be subjected to the same temperatures for a similar period. That is, each .1 c. c. added to the six-ounce sample corresponds to one ounce of bicarbonate of soda added to 1000 pounds of the evaporated milk, and thus when I have determined which is the proper sample to use, I treat the whole batch accordingly.

Heretofore so far as I am aware no process of telling exactly how to correct the evaporated milk for acidity was ever known, and therefore milk was lost and time was wasted in experimenting to determine just how much soda to add to get the desired result. The present test can be made quickly and accurately by an inexperienced operator instead of an experienced one, and a better batch of the product produced in a short time. I have said above that for the final fifteen minutes the heat of the sample is held at 243° for sterilization, but this temperature may vary between 240° and 246° according to the acidity of the milk in the batch without an appreciable effect on the product produced, thereby allowing a variation or latitude of 6° but no more or no less. It has been ascertained that a 1° variation in temperature is equal to a one minute variation in time; that is to say, if the milk is subjected to a temperature of 240° for twenty-one minutes, the same result is obtained as by subjecting the milk to a temperature of 246° for fifteen minutes when holding the temperature according to directions set forth above, the minimum safe sterilizing temperature being 240° for fifteen minutes, with a resultant uniformity in any number of batches and economy in heat or time.

Furthermore it has been ascertained that .1 c. c. of a 10.26% solution of bicarbonate of soda added to a sample container raises the temperature of the milk in that container exactly 1°. Therefore, by omitting the two ounces of bicarbonate of soda in the 1000 pound batch, the same sterilizing result will be obtained with a temperature of 241° for the final fifteen minutes. Or, if the container having .3 c. c. is selected as containing the proper guide, then the batch without the soda could be maintained at a temperature of 240° for the final fifteen minutes and the same sterilizing results obtained, thus permitting the saving of three ounces of bicarbonate of soda to each 1000 pounds of evaporated milk, with the resultant economy in heat and alkali.

V. The final step is cooling the batch rapidly after the sterilization operation. By this method any number of batches may be treated and the procedure is simple, it eliminates guess work so costly in sterilizing milk, especially in view of the fact that batches are worth as much as $500 each, excessive acidity is removed, and the best desired product of evaporated milk is obtained.

What is claimed is:

1. An improved process of making evaporated milk consisting of heating the milk, condensing the same, treating a plurality of samples of said condensed milk for maximum thickness and viscosity, and finally sterilizing the whole quantity of milk in accordance with the treatment of the selected sample.

2. An improved process of making evaporated milk after heating and condensing of the same, consisting in sterilizing a plurality of samples of equal volume with alkali solutions applied thereto to correct for acidity and then sterilizing the entire quantity of milk in accordance with the treatment accorded the volume selected as a sample because of its qualities.

3. An improved process of making evaporated milk after heating and condensing of the same, consisting in sterilizing a plurality of samples of equal volume with and without the addition of alkali material to test and correct for acidity at substantially 243° F. for fifteen minutes and then rapidly cooling said samples, and subsequently treating the batch of milk in the same manner as the selected sample.

4. An improved process of making evaporated milk consisting in heating the milk, condensing the same, sterilizing a plurality of samples of corresponding volume of the milk, having added to all but one of said samples varying quantities of sodium bicarbonate to correct for acidity, at 243° F. for fifteen minutes in a steam retort with the cage thereof revolving at a rate of 10 R. P. M., cooling said camples by blowing off the steam and admitting cold water into the retort, selecting the sample showing the required properties best suited for the purpose, and subsequently treating the whole batch of milk in a similar manner.

5. An improved process of making evaporated milk consisting in heating the same at such ratio as to bring 1000 pounds of fresh milk to a boiling point in a minimum of eight minutes, condensing said milk as by means of a vacuum condensing pan, subsequently sterilizing the milk so condensed at a temperature of from 240° F. to 246° F. for fifteen minutes, the temperature being brought to 190° F. in the first ten minutes, and then increased 5° a minute until the last minute and increasing 8° in that minute, and finally rapidly cooling the product.

6. An improved process of making evaporated milk consisting in heating the same at such ratio as to bring 1000 pounds of fresh milk to a boiling point in a minimum of eight minutes, condensing said milk as by means of a vacuum condensing pan, taking a plurality of corresponding small quantities of the condensed milk and adding thereto varying quantities of an alkali such as bicarbonate of soda, leaving one of said quantities with nothing added, sterilizing said samples between 240° F. and 246° F. for fifteen minutes, first bringing the temperature to 190° F. and successively raising the temperature gradually at 5° a minute to the last minute and then 8°, subsequently revolving the sample quantities, cooling said quantities and selecting the sample having the desired properties, then similarly treating the entire quantity of condensed milk, allowing a variance in temperature of 1° for each minute between the limits of temperature and time and also allowing 1° variance in temperature for each .1 c. c. of a 10.26% solution of the alkali added to each sample quantity at the ratio of one ounce for each 1000 pounds of condensed milk, and subsequently allowing the milk to cool.

7. An improved process of making evaporated milk consisting of heating the milk to the boiling point in eight minutes, condensing the milk irrespective of time, and subsequently sterilizing the milk under agitation between 240° and 246° F. according to the acidity of the milk determined by test, and increasing or decreasing the temperature or time in minutes required to sterilize the milk inversely in proportion to the acidity of the milk.

In testimony whereof I affix my signature in the presence of two witnesses.

O. W. MOJONNIER.

Witnesses:
C. E. WHITMORE,
C. H. GANTEVENIER.